US012760869B2

(12) United States Patent
Olson et al.

(10) Patent No.: US 12,760,869 B2
(45) Date of Patent: Oct. 13, 2026

(54) LIGHT FIXTURE WITH REMOVABLY MOUNTABLE SENSOR ASSEMBLY

(71) Applicant: Lucifer Lighting Company, San Antonio, TX (US)

(72) Inventors: Adam Olson, San Antonio, TX (US); Benjamin Karpen, Cypress, TX (US)

(73) Assignee: Lucifer Lighting Company, San Antonio, TX (US)

( * ) Notice: Subject to any disclaimer, the term of this patent is extended or adjusted under 35 U.S.C. 154(b) by 11 days.

(21) Appl. No.: 19/005,244

(22) Filed: Dec. 30, 2024

(65) Prior Publication Data

US 2025/0237369 A1 Jul. 24, 2025

Related U.S. Application Data

(60) Provisional application No. 63/623,969, filed on Jan. 23, 2024.

(51) Int. Cl.

| | |
|---|---|
| ***F21V 17/08*** | (2006.01) |
| ***F21V 17/10*** | (2006.01) |
| ***F21V 17/12*** | (2006.01) |
| ***F21V 23/04*** | (2006.01) |

(52) U.S. Cl.

CPC ............ *F21V 17/08* (2013.01); *F21V 17/105* (2013.01); *F21V 17/12* (2013.01); *F21V 23/0435* (2013.01)

(58) Field of Classification Search

CPC ........................................................ F21S 8/026

See application file for complete search history.

(56) References Cited

U.S. PATENT DOCUMENTS

| | | | | |
|---|---|---|---|---|
| 8,915,609 | B1 * | 12/2014 | Shah | H05B 45/30 362/648 |
| 9,163,814 | B2 * | 10/2015 | Plunk | F21V 23/008 |
| 2012/0147604 | A1 * | 6/2012 | Farmer | F21S 2/00 362/249.02 |
| 2014/0001952 | A1 * | 1/2014 | Harris | H05B 47/19 315/51 |
| 2018/0035187 | A1 * | 2/2018 | Cook | F21V 33/0056 |
| 2018/0091222 | A1 * | 3/2018 | Arai | F21S 8/026 |

* cited by examiner

*Primary Examiner* — Eric T Eide

(74) *Attorney, Agent, or Firm* — Harness, Dickey & Pierce, P.L.C.

(57) ABSTRACT

A light fixture assembly includes a housing comprising a first wall having a first opening therethrough. A light assembly is disposed at least partially within and coupled to the housing. A bracket has a second opening therethrough. A sensor housing has a first portion sized greater than the opening and a second portion received within the opening. The second portion has a retainer for retaining the sensor housing within the second opening of the bracket. A releasable fastener secures the bracket to the first wall.

20 Claims, 9 Drawing Sheets

LIGHT FIXTURE WITH REMOVABLY MOUNTABLE SENSOR ASSEMBLY

CROSS-REFERENCE TO RELATED APPLICATION

This application claims the benefit of U.S. Provisional Application No. 63/623,969, filed on Jan. 23, 2024. The entire disclosure of the above application is incorporated herein by reference.

REFERENCE FIELD

The present disclosure relates to light fixtures, and more particularly to a light fixture having a wireless sensor assembly mounted thereto.

BACKGROUND

This section provides background information related to the present disclosure which is not necessarily prior art.

Wireless nodes similar are gaining in popularity as a means of controlling the light fixtures in a space. The light fixtures can be wirelessly controlled individually or in groups through the wireless nodes. The wireless nodes allow control of the light fixture to be reconfigured allowing more flexibility that hard-wired applications. The wireless nodes are designed to fit within an industry standard electrical opening of ⅞" diameter. In known downlights, the nodes cannot be maintained from the room side after the fixture has been installed unless you have access to the ceiling above, which is uncommon. All electrical components are subject to failure, and when these wireless nodes fail, there is no way to replace them without major construction.

SUMMARY

This section provides a general summary of the disclosure and is not a comprehensive disclosure of its full scope or all of its features.

The present light fixture has a removably mounted sensor assembly that can be easily replaced without dismounting the housing from the surrounding structure.

In one aspect of the disclosure, a light fixture assembly includes a housing comprising a first wall having a first opening therethrough. A light assembly is disposed at least partially within and coupled to the housing. A bracket has a second opening therethrough. A sensor housing has a first portion sized greater than the opening and a second portion received within the opening. The second portion has a retainer for retaining the sensor housing within the second opening of the bracket. A releasable fastener secures the bracket to the first wall.

In another aspect of the disclosure, a light fixture assembly includes a housing comprising a first wall having a first opening therethrough. A light assembly is disposed at least partially within and coupled to the housing. A bracket comprises a center portion comprising a second opening. The center portion is disposed between a first flange and a second flange. The center portion is disposed in a first plane. The first flange and the second flange are coplanar and disposed in a second plane spaced apart from the first plane. A sensor housing has a first portion sized greater than the opening and a second portion received within the opening. The second portion has a retainer for retaining the sensor housing within the second opening of the bracket. A first magnet is disposed between the first flange and the first wall. A second magnet is disposed between the first flange and the first wall.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
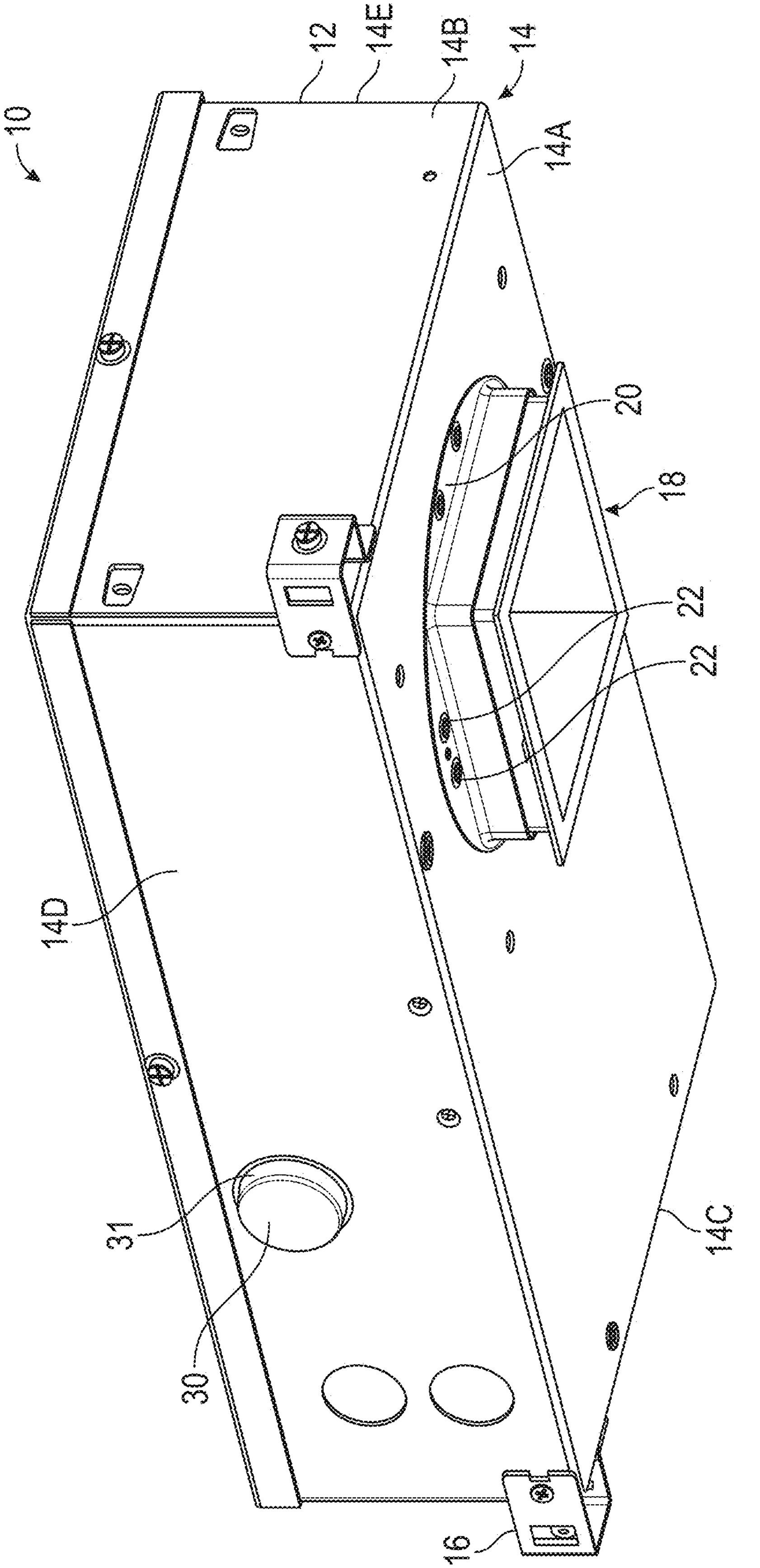
FIG. 1A is a perspective view of the sensor assembly protruding through the opening in a side wall of the light fixture housing. The finished portion of the light assembly is also shown.
Figure 1B:
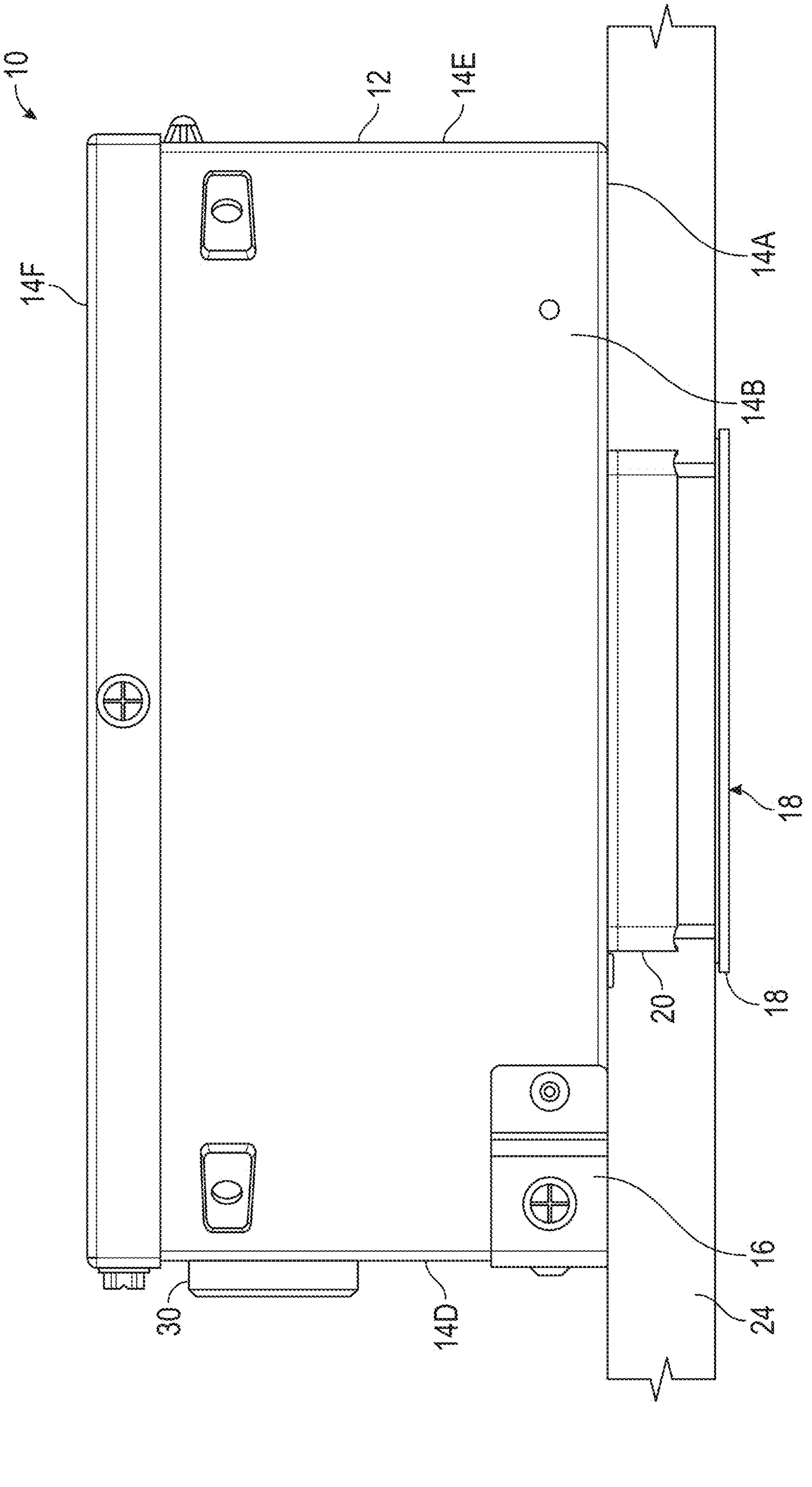
FIG. 1B is a side view of the light fixture housing showing the sensor assembly extending therefrom.
Figure 1C:
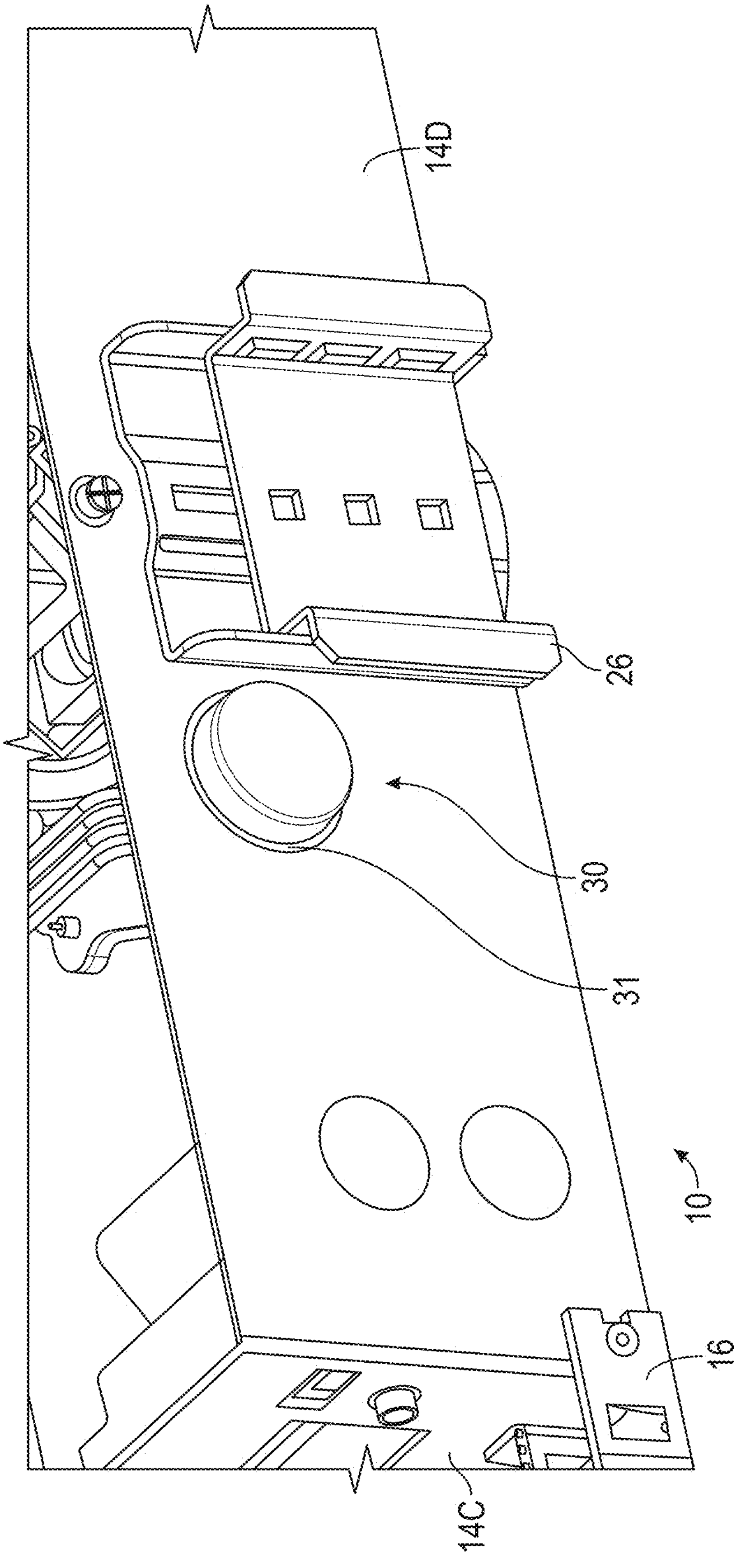
FIG. 1C is an enlarged partial view of the side wall of the light fixture housing with an optional exterior bracket coupled adjacent to the sensor assembly on a side wall of the fixture assembly.

Referring now to FIGS. 1A, 1B and 1C, a light fixture assembly 10 is illustrated. The light fixture assembly 10 has a housing 12 that is formed from a plurality of side walls. In the present example, there are six side walls that include a bottom side wall 14A, lateral side walls 14B and 14C, longitudinal side walls 14D and 14E. Side walls 14B-14E are perpendicular to the bottom side wall 14A. A top side wall 14F may also be provided perpendicular to side walls 14B-14E. The housing 12 in the present example forms a rectangular prism that is hollow and used to store various components as described below. Other shapes with various numbers of side walls may be used.

In the present example, brackets 16 may be coupled to the lateral side walls 14B and 14C and/or the longitudinal side walls 14D and 14E. The brackets 16 may be used to couple the housing 12 to structures within a building.

The housing 12 and the bottom side wall 14A has a light assembly 18 that extends therefrom. The light assembly 18 may include a cover 18A that is removable from a sleeve 20. The cover 18A may be coupled with fasteners or by an interference fit. The sleeve 20 is affixed to the bottom side wall 14A by fasteners 22.

The cover 18A and the sleeve 20 may extend far enough to allow the cover 18A to be positioned against building material 24. The material 24 may be drywall that is used to form a wall or a ceiling. Of course, other types of material such as wood, metal, concrete or the like may form the material 24.

The housing 12 has a sensor assembly 30 that partially extends therefrom. The sensor assembly 30, in this example, extends from the longitudinal side wall 14D. However, any one of the side walls 14A-14F may include the sensor assembly 30 extending therefrom. The sensor assembly 30 extends from an opening 31 through the side wall 14D. Because the walls 14A-14F are made of metal, the opening 31 allows RF signals to be communicated to and from the sensor assembly.

In FIG. 1C, an optional bracket 26 coupled to the side wall 14D is provided. The bracket 26 is located, in this example, adjacent to the sensor assembly 30.

Figure 2A:
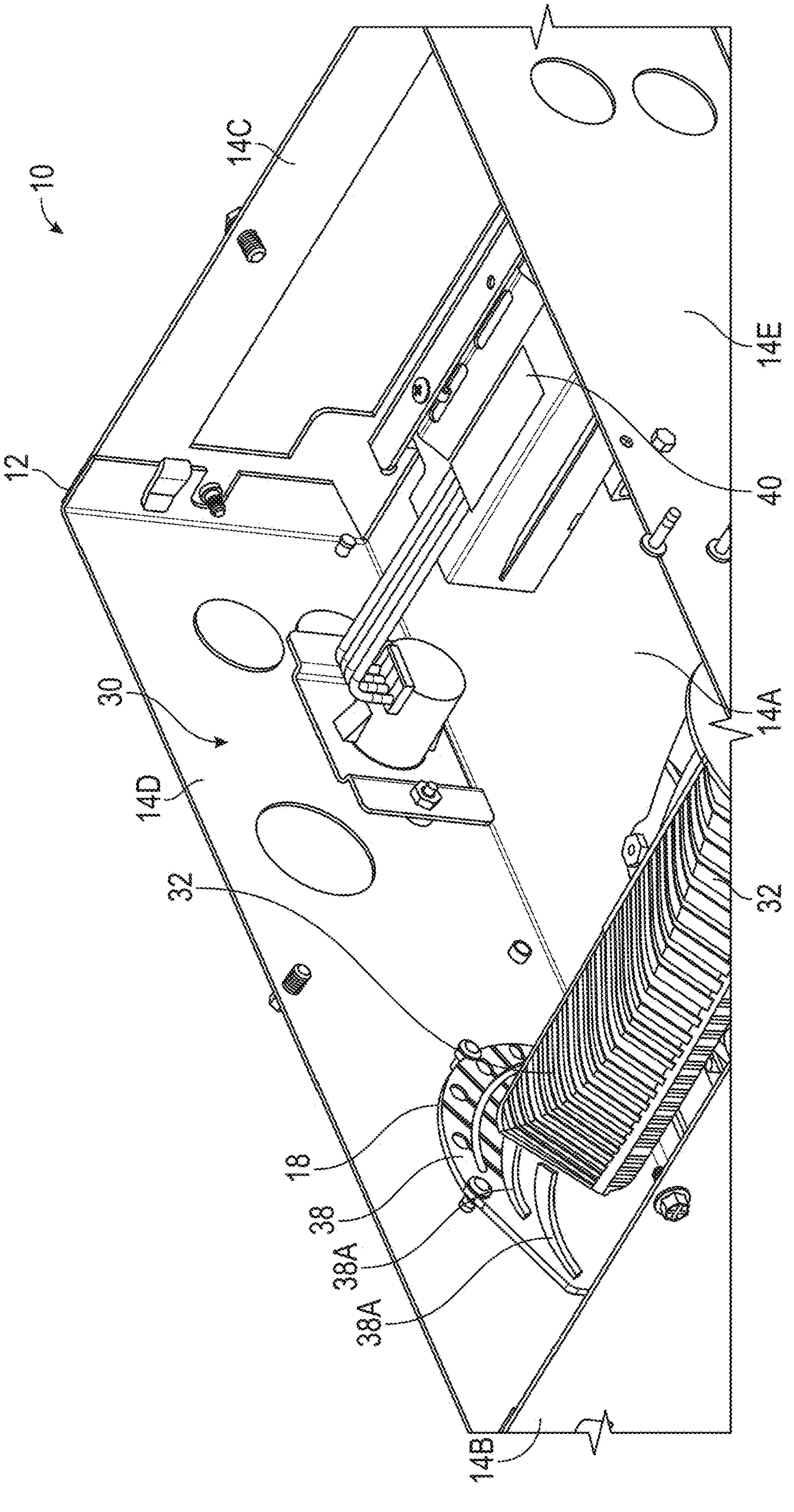
FIG. 2A is a perspective view of the sensor assembly of FIG. 1A prior to assembly within an opening of a light fixture housing.
Figure 2B:
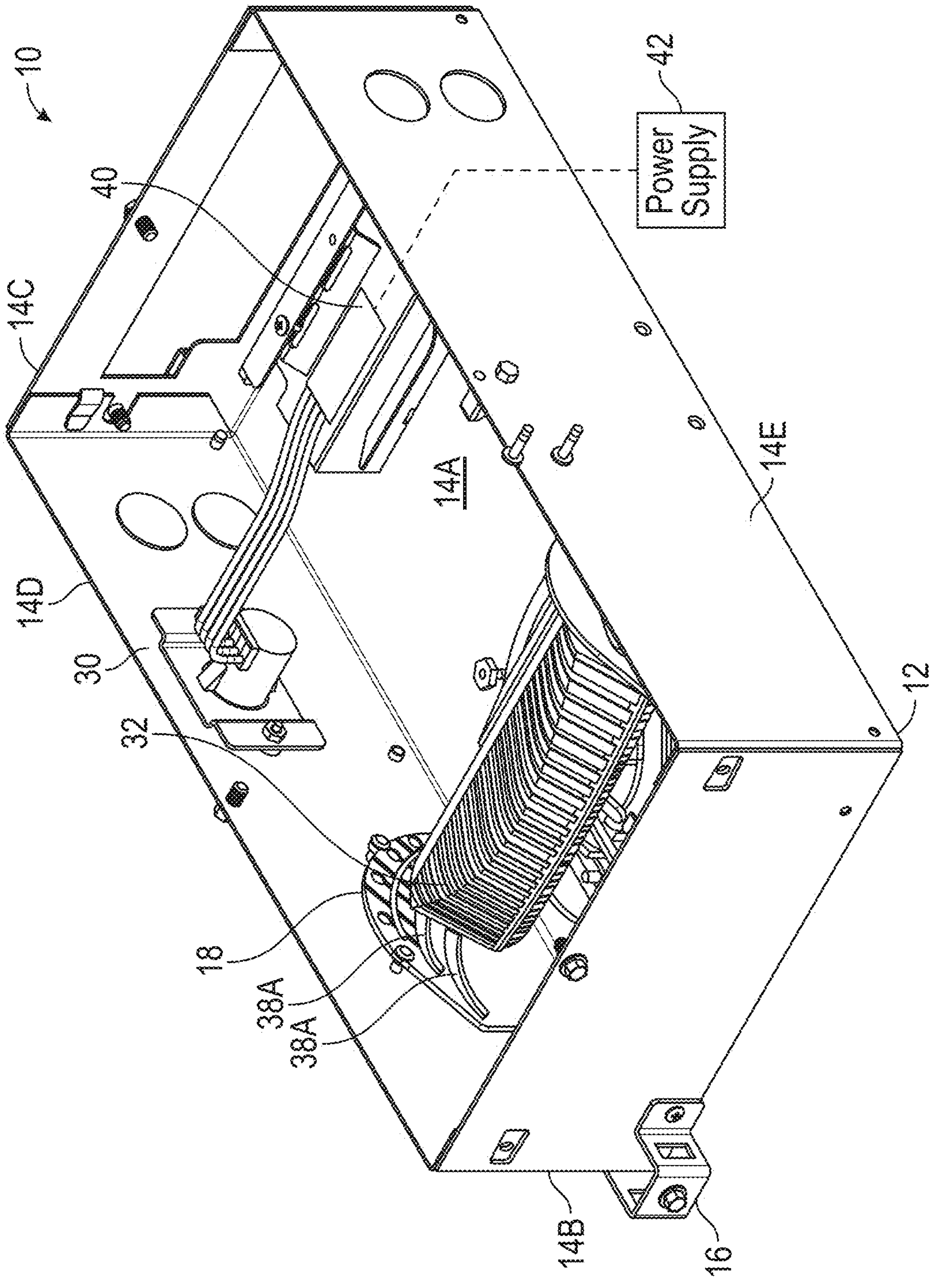
FIG. 2B is a perspective view of the sensor assembly of FIG. 1A coupled to an opening in the light fixture housing.
Figure 2C:
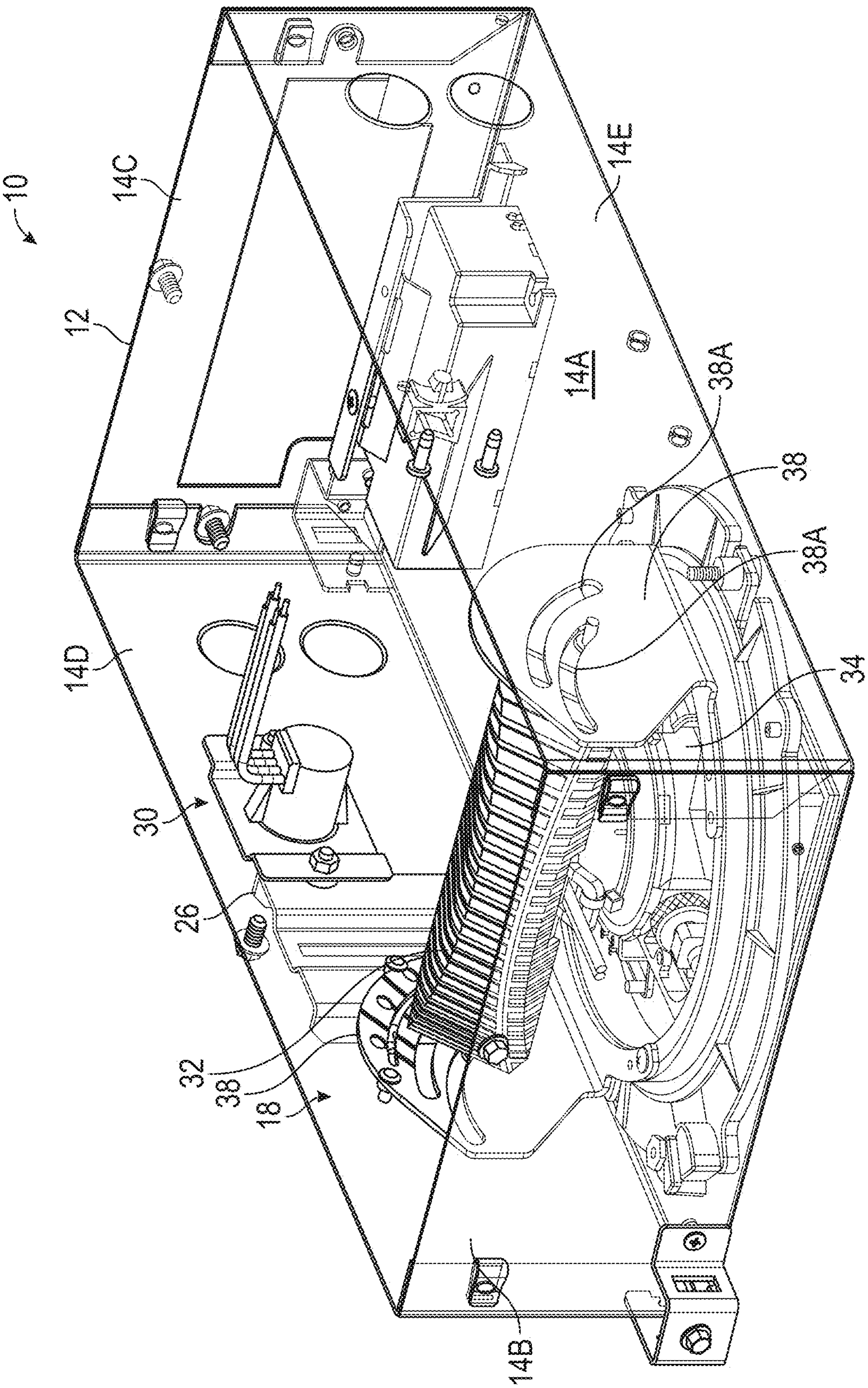
FIG. 2C is a perspective view of the sensor assembly of FIG. 1A coupled to an opening in the light fixture housing with the exterior wall semi-transparent showing the light assembly and an optional exterior bracket adjacent the sensor assembly.
Figure 2D:
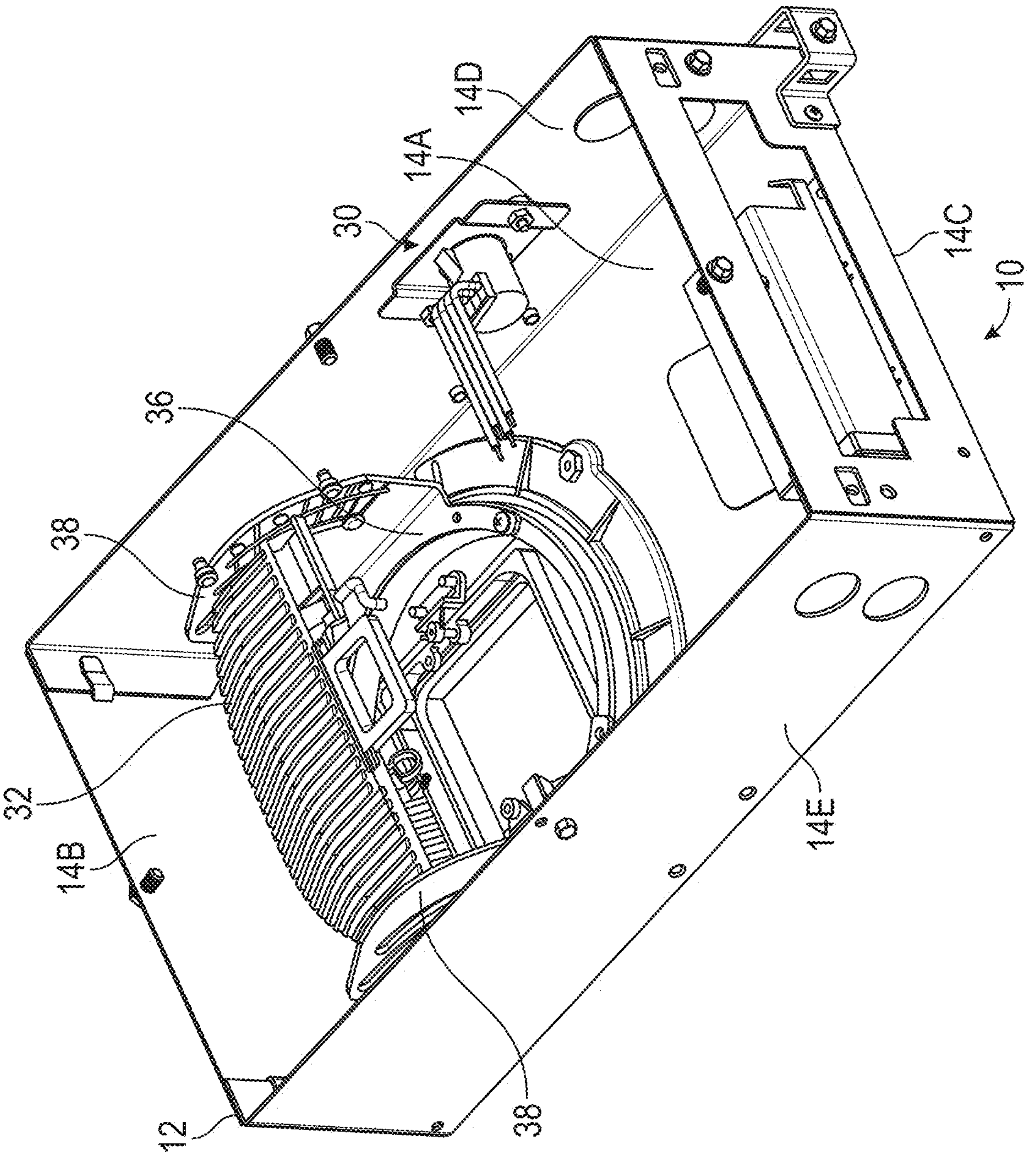
FIG. 2D is a perspective view of the light fixture housing with the light assembly removed so the sensor may be installed and removed.

Referring now to FIGS. 2A-2D, an interior view of the housing 12 with the top side wall 14F removed is set forth. In this example, the side walls 14A-14E are illustrated. The heat sink 32 is illustrated in a first position where the light source 34 of the light assembly 18 is in operation. The heat sink 32 is positioned above the light source 34 in this example. However, in FIG. 2D. the heat sink 32 is moved or rotated away from the opening 36 into which the light source 34 is coupled. This allows a technician's hand enough clearance within the housing 12 to reach the sensor assembly 30. In the present example, the heat sink 32 is positioned on heat sink brackets that have channels 38A that receive an end of the heat sink 32 to slidably position the heat sink 32 out of the way as illustrated in FIG. 2D. The sensor assembly 30 may be in communication with a controller 40 that is also disposed within the housing 12. A controller 40 is coupled to a power supply 42 external to the light fixture assembly 10. The power supply 42 may be the building power supply or a transformed power supply such as 12V DC power supply. The power supply 42 may depend on the electrical need for the light source 34.

Figure 3A:
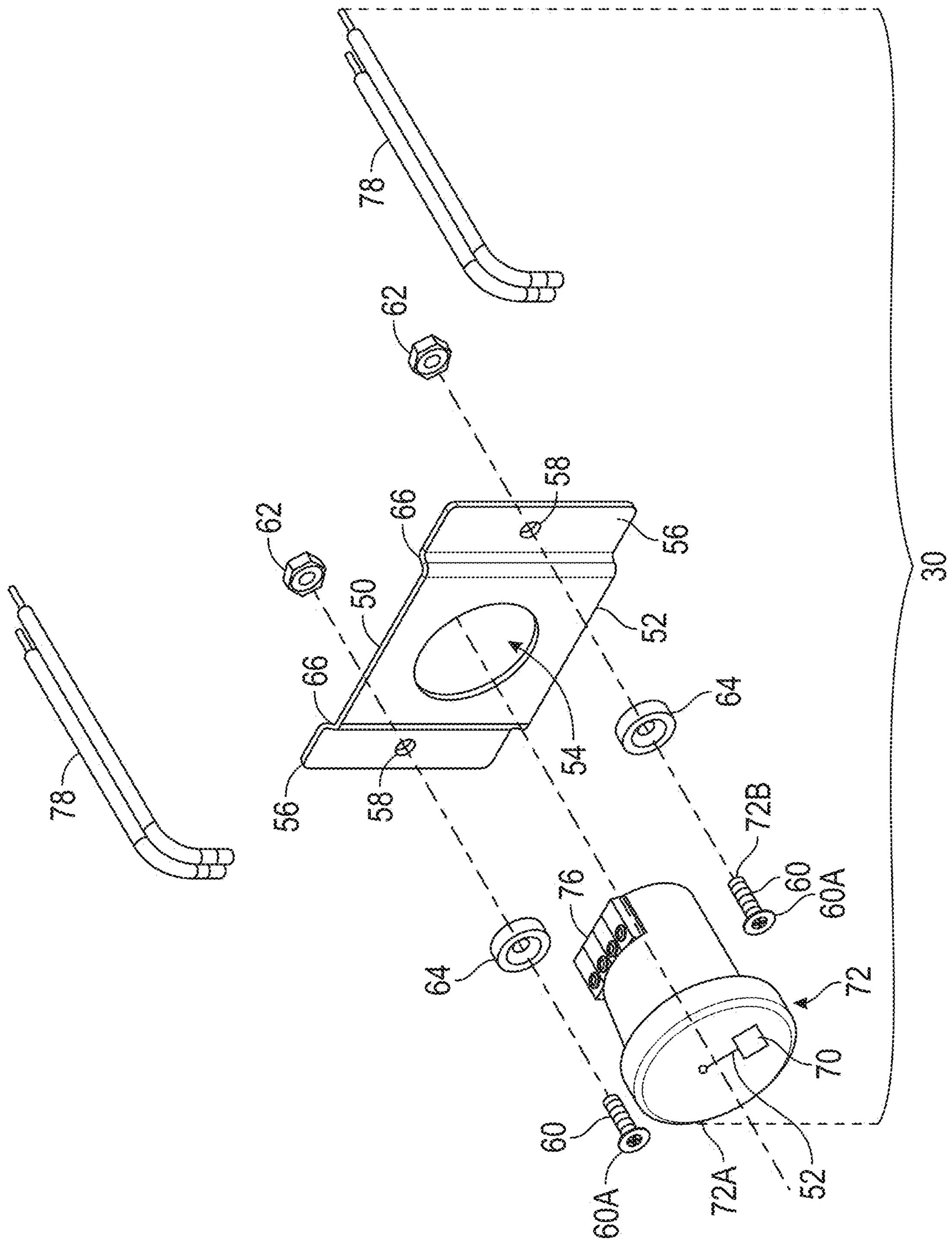
FIG. 3A is an exploded view of a sensor assembly formed according to the present disclosure.
Figure 3C:
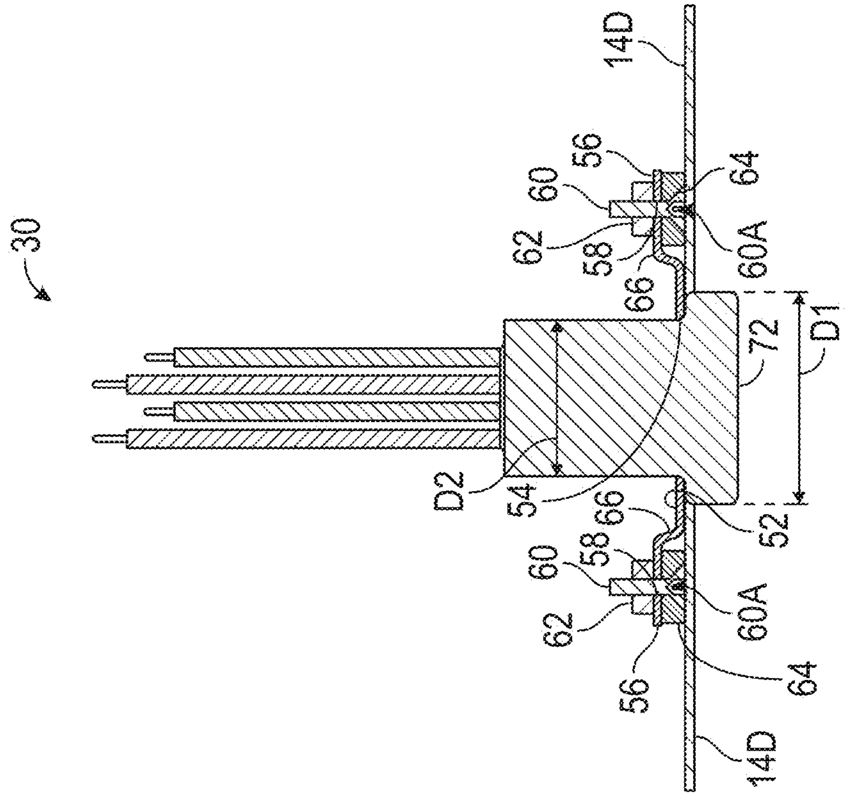
FIG. 3C is a cross-sectional view of the sensor assembly of FIG. 3A.
Figure 3B:
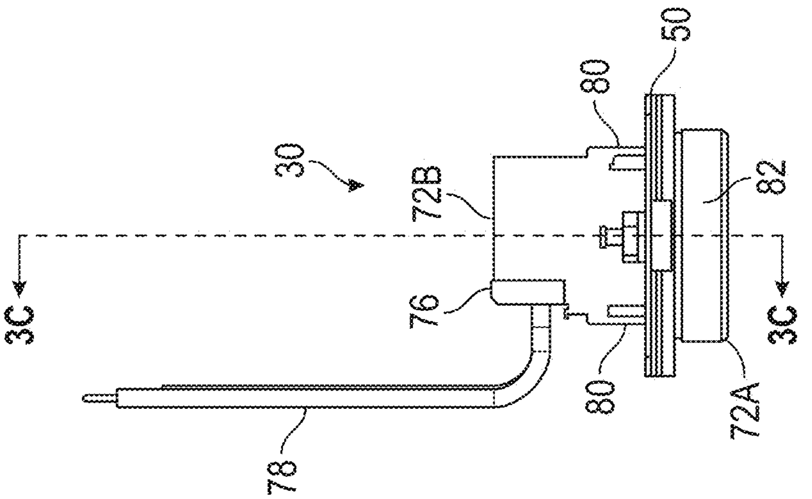
FIG. 3B is a side view of the sensor assembly of FIG. 3A.

Referring now to FIGS. 3A-3C, the sensor assembly 30 includes a sensor bracket 50. The sensor bracket 50 has a center portion 52 that has an opening 54 extending therethrough. In the present example, the sensor bracket 50 is rectangular. However, other shapes may be used. Sensor bracket 50 also includes flanges 56 that are disposed on each end of the center portion 52. The flanges 56, in this example, extend from opposite lateral side walls of the center portion 52. The flanges 56 may include fastener openings 58 that are used to receive a fastener 60. The fastener 60, in this example, is a threaded fastener such as a bolt that is secured within the fastener openings 58 of the flanges 56 by a nut 62. The fasteners 60 may secure respective magnets 64 to the flanges 56. The magnets 64 have a thickness. The flanges 56 may be disposed on the same plane and therefore are coplanar. The center portion 52 may be on a different plane space apart from the plane of the flanges 56. The thickness of the magnet 64 may be about that of an offset wall 66 between the plane of the center portion and the plane of the flanges 56 to allow the magnets to couple to the longitudinal side wall 14D as illustrated in FIG. 3C. As illustrated in FIG. 3C, a head 60A of each fastener 60 is recessed within the magnet 64 to allow the magnet 64 to touch and couple with the longitudinal side wall 14D. FIG. 3C also illustrates the plane of the center portion 52 and the plane of the flanges 56.

The sensor assembly 30 has a sensor 70 that has a sensor housing 72. The sensor housing 72A has a first portion 72A and a second portion 72B. The first portion 72A is larger than the second portion 72B. In this example, the first portion 72A and the second portion 72B are cylindrical. Therefore, the diameter D1 of the first portion 72B is greater than the diameter D2 of the second portion 72B. In this manner, the opening 54 is just greater than the diameter D2 to allow the second portion 72B to be received within the opening 54. Should the opening 54 be a shape other than round, the size of the second portion 72B is just smaller than the opening 54 to allow the second portion to be received therein.

The sensor assembly 30 has a connector 76 that couples to wires 78 that are used to connect the sensor 70 within the housing 72 to the controller 40 as illustrated above in FIG. 2A.

The second portion 72B of the sensor housing 72 has a retainer such as tabs 80 that extend therefrom. The tabs 80, as illustrated best in FIG. 3B, are movable in the inward direction and are biased outwardly as illustrated in FIG. 3B. The tabs 80 secure the sensor 70 within the opening 54 so that the tab 80 secures the sensor bracket to the first portion 72A of the sensor housing 72. That is, the sensor bracket 50 is disposed between the tabs 80 and the first portion 72A of the sensor housing 72.

The sensor 70 may have an antenna 82 that is used to receive and/or transmit RF signals. The sensor 70 in one example is an Athena® wireless node by Lutron®, which is a Wi-Fi sensor. The openings 31 and 54 are aligned to allow the sensor housing 72 to extend therefrom and to allow RF signals to be communicated from light fixture assembly 10 without being impeded by the housing 12.

In operation, the sensor housing 72 and, in particular, the second portion 72B is pushed into the hole or opening 54 of the sensor bracket 50. As that is being done, the retainer is used to secure the sensor housing to the bracket 50. In this example, the tabs 80 are pushed inward. When the sensor housing 72 is fully inserted, the tabs 80 pop out to hold the sensor housing 72 to the sensor bracket 50 as shown best in FIG. 3B. The center portion 52 of the sensor bracket 50 is positioned between the tabs 80 and the large diameter end (first portion 72A) of the sensor housing 72 when assembled. The magnets 64 are coupled to each of the two flanges 56. The magnets 64 may be referred to as a releasable fastener. However, the releasable fastener may be a nut, screw, a hook and loop fastener or other mechanical means.

To assemble the light fixture housing 12, the technician connects the wire connector 76 to the sensor 70 and inserts the first portion 72A of the sensor housing 72 through the opening 31 in one of the walls such as the longitudinal wall 14D of the housing 12. The releasable fastener such as the magnets 64 hold the sensor 70 and bracket 50 in place from the inside. In one example, the RF signals to and from the antenna 82 of the sensor 70 is unimpeded by the light housing 12 because of the first portion of the housing protruding out from the housing 12. Housings 12 are typically formed from metal which block RF signals.

When assembled, the center portion 52 of the sensor bracket 50 is flush against the inside of the longitudinal side wall 14D of the light fixture housing 12. The flanges 56 are disposed in a plane offset by the offset wall 66 from the plane of the center portion 52. The offset amount corresponds to thickness of the magnets 64 or the other releasable fastener used. The nut 62 is coupled to the fastener 60 when it is a bolt and extends through the magnets 64 and the flanges 56 to hold the magnets 64 to each flange 56. Alternate versions of the sensor bracket 50 could include being die cast or injection molded, with magnets affixed with a friction fit, adhesives, or other mechanical means.

To remove the sensor assembly, the light assembly 18 is removed from the bottom of the housing 12. The technician reaches into the opening 36 left by the light assembly 18. The sensor assembly 30 is pulled from the inside of the housing 12 with force enough to decouple the releasable fastener such as the magnets 64 from the side wall 14D. The opening 36 shown best in FIG. 2D is sized to allow a technician to reach into the housing and disconnect the connector 76, replace the sensor assembly 30 with a new one and push the end of the sensor housing 72 of the sensor assembly 30 into the opening 54. The opening 54 may conform to the shape of the sensor housing 72 such as round, square or various shapes depending on the light assembly design. The releasable fastener is then coupled to longitudinal side wall 14D. The first end 72A of the sensor housing 72 is aligned with the opening 31 as the bracket is coupled to the side wall 14D.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the term first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light fixture assembly comprising:
- a housing comprising a first wall having a first opening therethrough;
- a light assembly disposed at least partially within and coupled to the housing;
- a bracket having a second opening therethrough at a center portion parallel to the housing, said second opening smaller than the first opening and the second opening is adjacent to and aligned within the first opening;
- a sensor housing having a first portion sized greater than the second opening and sized less than the first opening, and the sensor housing having a second portion received within the second opening, the second portion having a retainer for retaining the sensor housing within the second opening of the bracket; and
- a releasable fastener securing the bracket to the first wall.

2. The light fixture assembly of claim 1 wherein the releasable fastener comprises a magnet.

3. The light fixture assembly of claim 1 wherein the bracket comprises the center portion comprising the second opening, a first flange and a second flange.

4. The light fixture assembly of claim 3 wherein the center portion disposed in a first plane, the first flange and the second flange are coplanar and disposed in a second plane spaced apart from the first plane.

5. The light fixture assembly of claim 4 wherein the first plane is directly adjacent to the first wall.

6. The light fixture assembly of claim 3 wherein the first flange is coupled to a first magnet and the second flange is coupled to a second magnet.

7. The light fixture assembly of claim 1 wherein the releasable fastener comprises a first releasable fastener and a second releasable fastener.

8. The light fixture assembly of claim 7 wherein the first releasable fastener comprises a first threaded fastener and the second releasable fastener comprises a second threaded fastener.

9. The light fixture assembly of claim 8 wherein the first threaded fastener is coupled to a first magnet and the second threaded fastener is coupled to a second magnet.

10. The light fixture assembly of claim 1 wherein the retainer comprises a first tab and a second tab.

11. A light fixture assembly comprising:

a housing comprising a first wall having a first opening therethrough;

a light assembly disposed at least partially within and coupled to the housing;

a bracket having a second opening therethrough;

a sensor housing having a first portion sized greater than the second opening and a second portion received within the second opening, the second portion having a retainer comprising a first tab and a second tab for retaining the sensor housing within the second opening of the bracket; and a releasable fastener securing the bracket to the first wall;

the sensor housing is removably coupled to the bracket by the first tab and the second tab.

12. The light fixture assembly of claim 11 wherein the bracket is disposed between the first portion and, the first tab and the second tab.

13. The light fixture assembly of claim 1 wherein the light assembly is coupled within a bottom side wall, the bottom side wall being perpendicular to the first wall.

14. The light fixture assembly of claim 1 wherein the sensor housing comprises a Wi-Fi sensor.

15. The light fixture assembly of claim 1 wherein the sensor housing comprises an antenna aligned with the first opening and the second opening.

16. A light fixture assembly comprising:

a housing comprising a first wall having a first opening therethrough;

a light assembly disposed at least partially within and coupled to the housing;

a bracket comprising a center portion comprising a second opening, the center portion disposed between a first flange and a second flange, the center portion disposed in a first plane, the first flange and the second flange are coplanar and disposed in a second plane spaced apart from the first plane;

a sensor housing having a first portion sized greater than the second opening and a second portion received within the second opening, the second portion having a retainer for retaining the sensor housing within the second opening of the bracket;

a first magnet disposed between the first flange and the first wall; and a second magnet disposed between the first flange and the first wall.

17. The light fixture assembly of claim 16 wherein the first magnet is coupled to the first flange and the second magnet is coupled to the second flange.

18. The light fixture assembly of claim 16 wherein the retainer comprises a first tab and a second tab.

19. The light fixture assembly of claim 18 wherein the sensor housing is removably coupled to the bracket by the first tab and the second tab.

20. The light fixture assembly of claim 16 wherein the light assembly is coupled within a bottom wall, the bottom wall being perpendicular to the first wall.

* * * * *